N. I. MILLIKEN.
GANG PLOW.
APPLICATION FILED JUNE 19, 1913.
1,119,624.
Patented Dec. 1, 1914
3 SHEETS—SHEET 1.
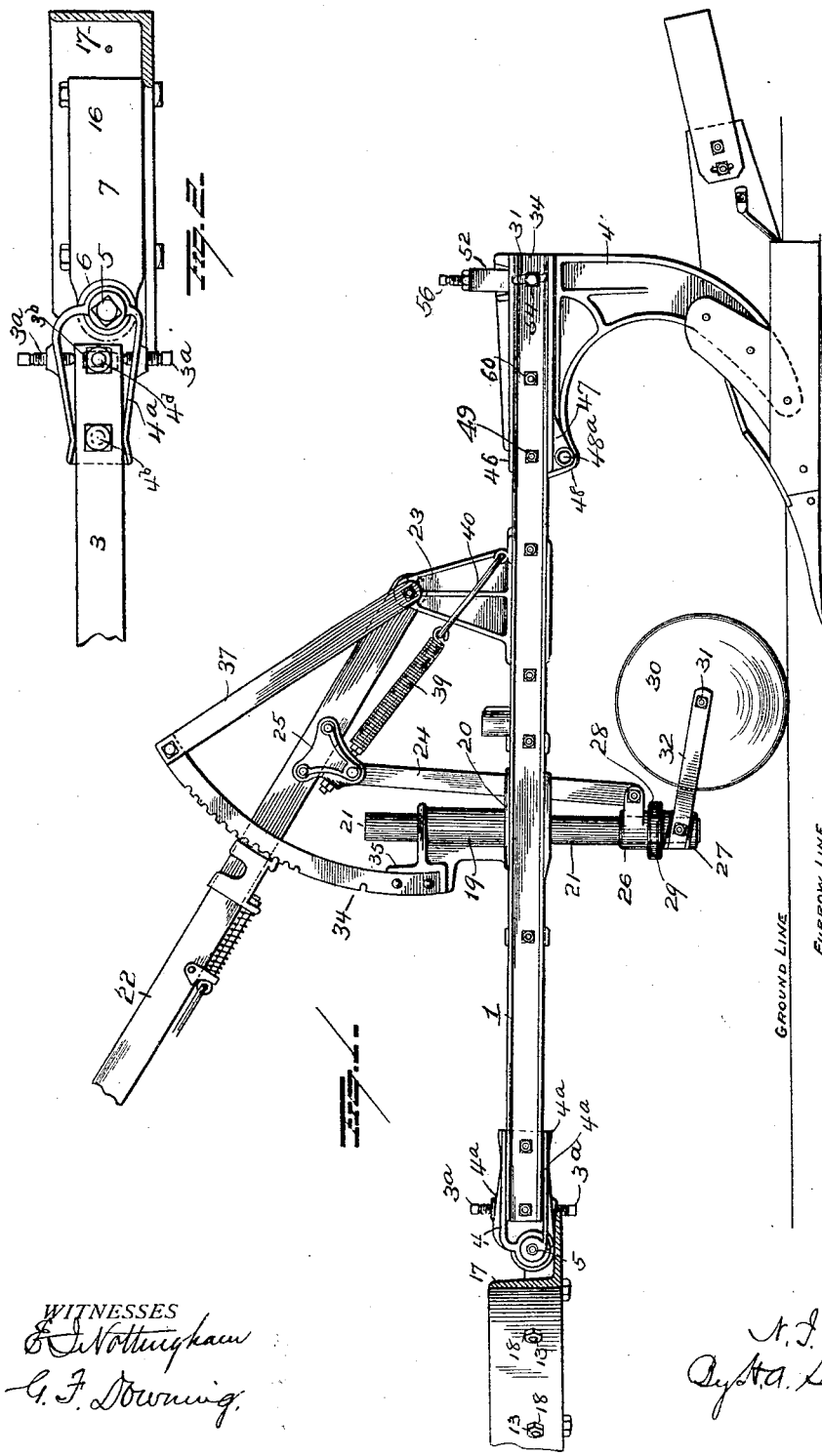
WITNESSES
INVENTOR
Attorney

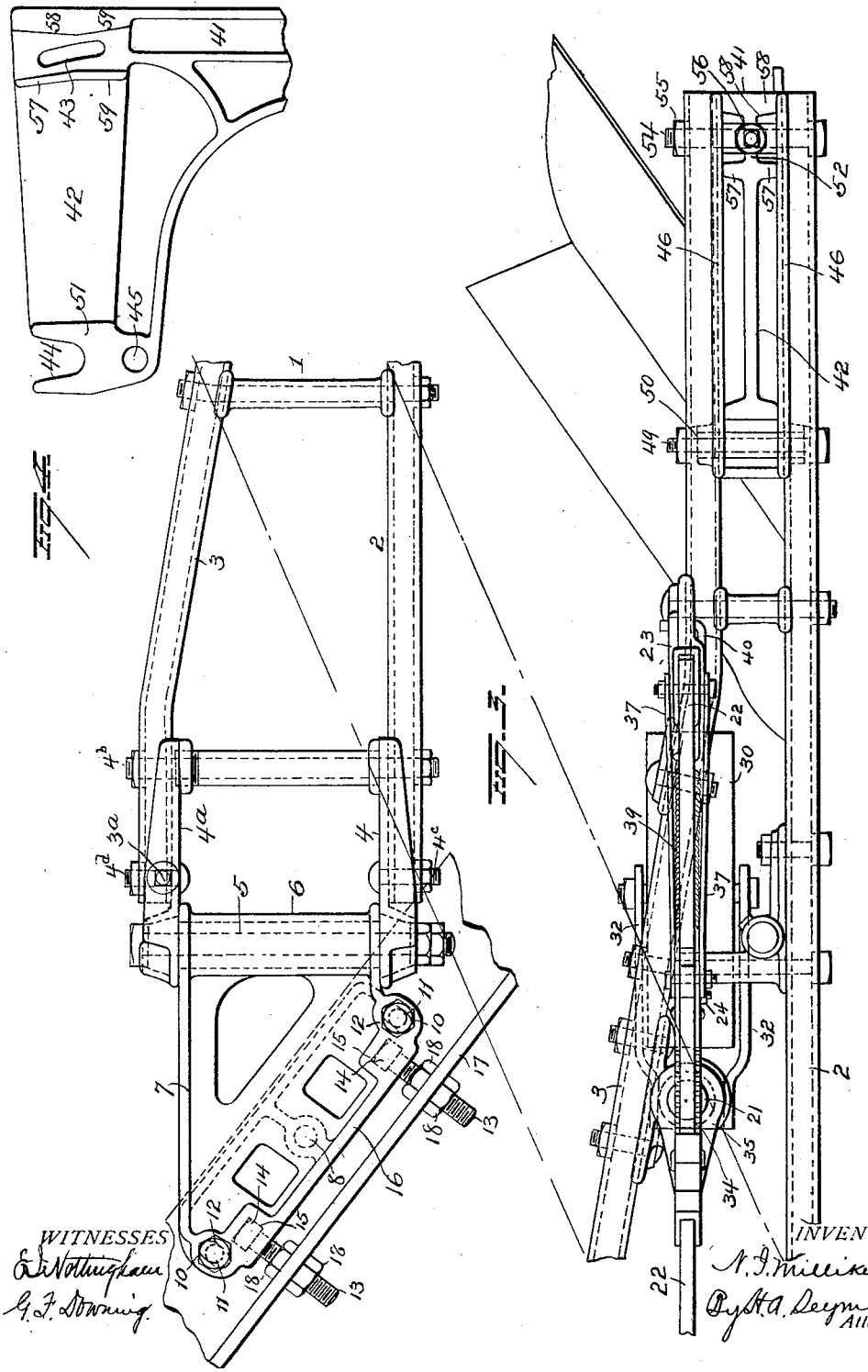

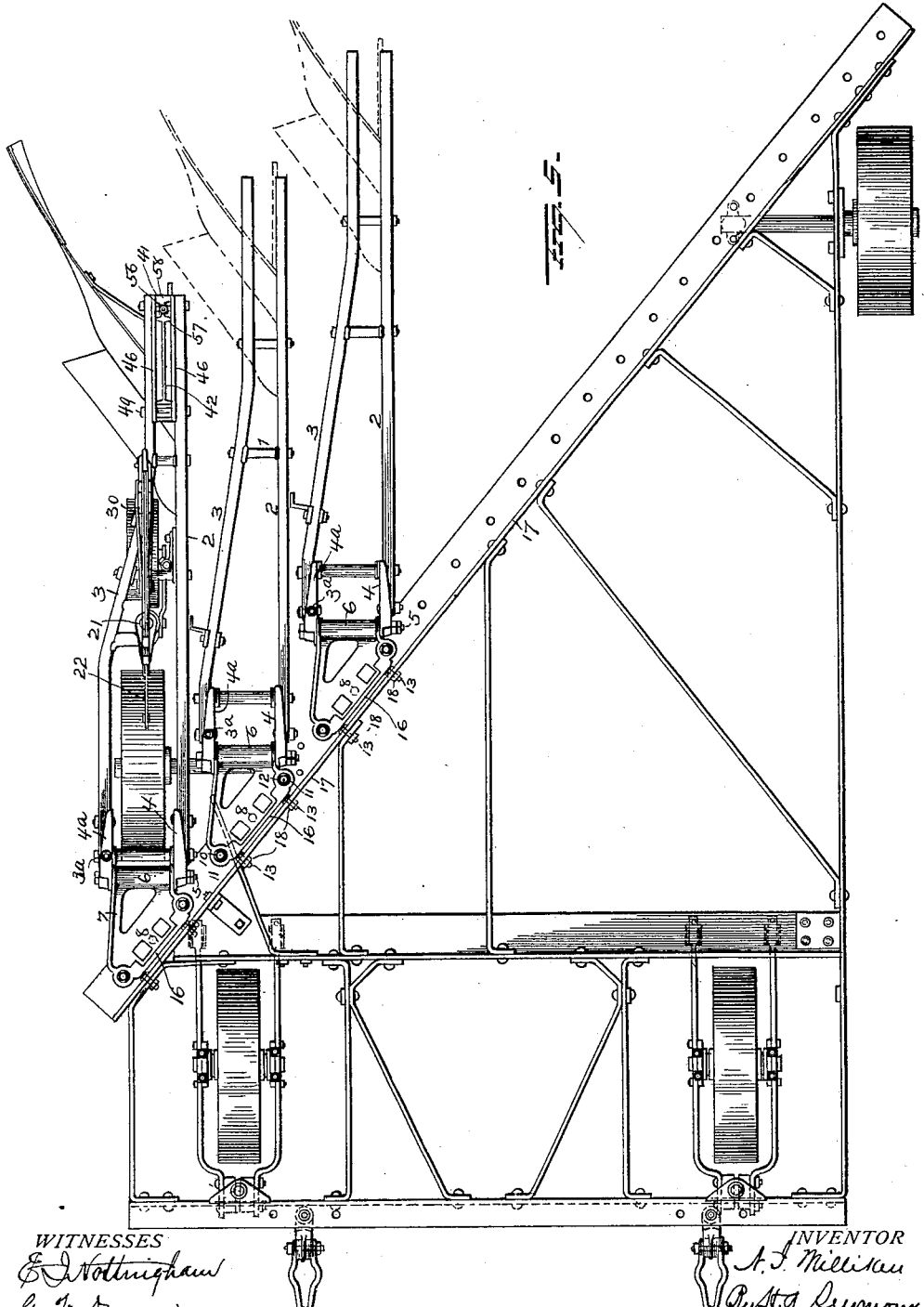

UNITED STATES PATENT OFFICE.

NORMAN I. MILLIKEN, OF SOUTH BEND, INDIANA, ASSIGNOR TO OLIVER CHILLED PLOW WORKS, OF SOUTH BEND, INDIANA.

GANG-PLOW.

1,119,624.     Specification of Letters Patent.     Patented Dec. 1, 1914.

Application filed June 19, 1913. Serial No. 774,669.

*To all whom it may concern:*

Be it known that I, NORMAN I. MILLIKEN, of South Bend, in the county of St. Joseph and State of Indiana, have invented certain new and useful Improvements in Gang-Plows; and I do hereby declare the following to be a full, clear, and exact description of the invention, such as will enable others skilled in the art to which it appertains to make and use the same.

This invention relates to an improvement in gang plows and has for its object to provide simple and efficient means for imparting independently, both lateral and vertical adjustment to each of the several plow beams of a gang plaw.

With this object in view the invention consists in the features of construction and combinations of parts which will be hereinafter described and pointed out in the claim.

In the accompanying drawings, Figure 1 is a view in side elevation of one of the plow beams of my improved gang plow; Fig. 2 is a detail view showing the connection of the bar 3 with the bracket 7; Fig. 3 is an enlarged plan view of the structure shown in Fig. 1; Fig. 4 is a side elevation of the upper portion of the plow standard, and Fig. 5 is a plan view showing the truck frame and several plow units connected therewith.

1 represents the plow beam which is formed of the channel bars 2—3, the forward end of each beam section being secured to the arms 4, $4^a$ by bolts $4^b$, $4^c$ and $4^d$ and said arms being pivotally mounted at their forward ends upon the opposite ends of a bolt 5 which passes through a sleeve 6 on the rear end of the laterally adjustable bracket 7. This bracket is pivoted to the frame by a bolt 8 which passes through the longitudinal center of its inclined rear side whereby the pivotal center of the bracket is approximately in line with the line of draft of the plow. An arc shaped slot 10 is formed at each end of the bracket and through these slots, the bolts 11 pass. By loosening the nuts 12 on the bolts 11, the bracket may be swung upon its pivotal center and laterally adjusted and the plow beam and plow attached thereto secured in any desired lateral adjustment by then tightening the nuts 12. The bracket is additionally secured by means of bolts 13, the heads 14 of which are inserted in recesses 15 formed in the flange 16 of the bracket, while the threaded portions of the bolts extend through holes in the vertical flange 17 of the frame and are secured in any desired adjustment by means of the nuts 18. By pivoting the bracket at its center to the frame, the draft of the plow is transmitted to the frame in a line which approximately coincides with a line passing through the longitudinal center of the beam and the pivotal bearing of the bracket and hence the bracket will have little or no tendency to swing laterally in either direction, and its lateral adjustment and that of the plow beam and plow may be quickly effected by means of the bolts at opposite ends of the bracket and on opposite sides of its pivotal bearing, and also by the bolts which serve to adjustably secure the inclined end of the bracket to the upright flange of the plow frame, which serves to firmly fasten the bracket to the plow frame. The channel bar or member 3 of the beam is connected with the arm $4^a$, in such manner that it can have a slight vertical adjustment relatively to the other beam member 2, for the purpose of leveling the soil engaging member at the rear end of the beam. Such adjustment of the beam member 3 may be effected by screws $3^a$—$3^a$ passing through the flanges of the arm $4^a$ and engaging said beam member 3,—the bar 3 being provided with a slot $3^b$ for the passage of the bolt $4^d$.

19 is a vertical sleeve mounted upon a plate 20 which is bolted to one of the channel bars of the beam. A sliding post 21 is mounted in the sleeve and is free to slide vertically therein. The sliding post is raised and lowered by means of a hand lever 22 pivotally mounted in the upper end of a bracket 23, and a connecting rod 24, the upper end of which is pivoted between the depending ends of two triangular plates 25 secured to hand lever 22, while its lower end is pivoted to a sleeve 26 firmly secured to the sliding post near its lower end. Upon the lower end of the sliding post is mounted a sleeve 27 which is free to rotate and is upheld by engagement of an annular flange 28 on its upper end with an annular flange 29 on the lower end of the non-rotatable sleeve 26. A caster gage wheel 30 is mounted on an axle 31 carried by the trailing arms 32, the forward ends of which are fastened to the rotary movable sleeve 27.

The hand lever is locked in any desired adjustment by means of a spring actuated bolt or catch which engages the teeth of a sector rack 34, the lower end of which is fastened to a projection 35 on the sleeve 19, while its upper end is supported by an arm 37, the lower end of which is fastened to the bracket 23. A spiral spring 39 is connected with the plow beam by a link 40, while its upper end is connected with the triangular plates 25 on the hand lever.

When it is desired to lift the plow beam and plow attached thereto, the hand lever is forced downwardly and the upper end of the connecting rod 24, to which the lever is pivotally connected, serves as its fulcrum and causes the rear end of the lever to lift the plow beam and plow. The arrangement of the connecting rod 24 with relation to the sliding post 21, is such as to enable the plow beam to be lifted or vertically adjusted with the minimum expenditure of power and avoid friction of engaging surfaces. As the caster gage wheel is located in rear of the sliding post, the weight of the plow beam tends to tilt the lower end of the post rearwardly and its upper end forwardly. In order to counteract this tendency and reduce the friction between the sliding post and the vertical sleeve in which it is mounted, when the plow beam is raised and lowered, the connecting rod is located in rear of the sliding post and connected to its lower end, whereby the power is transmitted through the connecting rod to the sliding post in the operation of lifting the beam in a direction which tends to tilt the lower end of the sliding post forwardly and its upper end rearwardly and thereby counteract the tendency of the weight of the beam to tilt the post in the opposite direction. By the foregoing arrangement of parts the friction between the sliding post and its sleeve is minimized and the manipulation of the parts is greatly facilitated.

The spiral spring 39, is so arranged with relation to the hand lever that when the latter is raised to its highest and least effective position, the spring is stretched to its maximum extent and exerts its maximum force in assisting the plowman to raise the plow beam. As the hand lever is forced downwardly in the operation of lifting the beam, the effective power of the lever is increased and that of the spring is gradually decreased, and hence there is a mutual cooperation of these two instrumentalities in raising and lowering the plow.

41 represents the plow standard, the upper end of which is provided with a forwardly projecting arm 42, having an arc shaped slot 43 in its rear end, while its forward end is provided with an open slot 44 in its upper edge and a break pin hole 45 near its lower edge. Between the sides of the arm and the channel beams are interposed the friction plates 46, the forward ends of which are formed with depending lugs 47, each of which is provided with a hole 48. The break pin 48$^a$ is inserted through the holes in the friction plates and the hole 45 in the arm of the standard. A bolt 49 passes through holes 50 in the channel beams and the open slot 44 in the forward end of the standard arm 42, and serves to force and hold the outer surfaces of the arm into snug frictional contact with the inner surfaces of the friction plates 46, and to insure a large area of frictional contact surface the opposite sides of the forward end of the standard arm are each provided with a flat bearing surface 51 which extends the entire width of the arm.

52 is a stirrup the depending arms of which are interposed between the rear end of the standard arm and the friction plates. A bolt 54 passes through the channel beams, the arms of the stirrup, the friction plates and the arc shaped slot 43 in the standard arm, and is retained in place by a nut 55. A set screw 56 passes through the upper end of the stirrup and engages the upper end of the standard. In order to insure an intimate frictional engagement of the rear end of the standard arm with the inner surface of the friction plates, the rear end of the standard arm is provided on its opposite sides with ribs 57—58 having flat faces 59 extending the entire width of the arm and which engage the inner surfaces of the friction plates. To adjust the angular position of the standard with relation to the beam, for the purpose of varying the pitch or suction of the plow, the nut 55 is loosened which permits the standard to be raised or lowered as may be desired and when properly adjusted the nut is again tightened with the effect of forcing the friction plates into snug frictional contact with the opposite sides of the standard arm and retaining it against accidental movement or displacement. The set screw 56 is then adjusted so as to engage the upper edge of the standard and prevent its upward movement and displacement. It will thus be observed that the pitch or suction of the plow may be readily varied to suit different soils or conditions of the soil. In the event the plow should strike an obstruction which would be liable to break or injure the plow point or other part of the plow, the abnormal strain on the plow would operate to break the break pin and permit the plow to rotate on the bolt 54 and thus ride over the obstruction and thereby preserve the plow against breakage or injury. Whenever the soil is such that no obstructions of a character to injure the plow are liable to be encountered, the forward end of the standard arm may be secured to the beam by a bolt 60.

While I have described one embodiment of my invention, I would have it understood that I do not restrict myself to the particular construction and arrangement of parts herein shown and described. It is evident that the laterally adjustable bracket which provides for the lateral adjustment of the beam, may be secured in its lateral adjustment by means of the set screws which extend through the upright flange of the frame and the bolts passing through the arc shaped slots at the opposite ends of the bracket might be dispensed with. As thus modified the central pivotal bolt or bearing for the bracket would be made of ample size and strength to safely connect the plow beam to the frame and the set screws would serve to maintain the bracket at any desired lateral adjustment. The mechanism for raising and lowering the plow beam and bar adjustably connecting the standard to the beam may also be modified in many ways without departing from the spirit of my improvement, and hence I do not restrict myself to the exact construction and arrangement of parts shown and described. Neither do I claim herein the manner of mounting and adjusting the caster gage wheel, nor the construction of plow standard and means for attaching same to the plow beam, but reserve the right to claim same in other applications.

Having fully described my invention what I claim as new and desire to secure by Letters Patent, is:—

In a gang plow, the combination with a rearwardly and laterally inclined frame having a vertical flange, a plow, a bracket, and a vertical bearing on which the bracket is pivotally connected with the inclined frame at a point approximately in line with the maximum draft of the plow, of adjusting bolts for adjustably connecting the opposite ends of the bracket with the vertical flange on the frame, and bolts for securing the opposite ends of the bracket to the horizontal portion of the frame, substantially as set forth.

In testimony whereof, I have signed this specification in the presence of two subscribing witnesses.

NORMAN I. MILLIKEN.

Witnesses:
 LOUISE A. MANN,
 H. SEYMOUR BETTS.

Copies of this patent may be obtained for five cents each, by addressing the "Commissioner of Patents, Washington, D. C."